(12) United States Patent
Perez Barrera et al.

(10) Patent No.: US 11,037,449 B2
(45) Date of Patent: Jun. 15, 2021

(54) AUTONOMOUS BUS SILENT ALARM

(71) Applicant: Ford Global Technologies, LLC, Dearborn, MI (US)

(72) Inventors: Oswaldo Perez Barrera, Texcoco (MX); Alvaro Jimenez Hernandez, Mexico City (MX)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 65 days.

(21) Appl. No.: 16/482,523

(22) PCT Filed: Feb. 1, 2017

(86) PCT No.: PCT/US2017/015971
§ 371 (c)(1),
(2) Date: Jul. 31, 2019

(87) PCT Pub. No.: WO2018/143974
PCT Pub. Date: Aug. 9, 2018

(65) Prior Publication Data
US 2021/0049912 A1 Feb. 18, 2021

(51) Int. Cl.
*B60Q 1/52* (2006.01)
*G08G 1/0965* (2006.01)
*G08G 1/127* (2006.01)
*G08G 1/00* (2006.01)

(52) U.S. Cl.
CPC .............. *G08G 1/205* (2013.01); *B60Q 1/52* (2013.01); *G08G 1/0965* (2013.01); *G08G 1/127* (2013.01)

(58) Field of Classification Search
None
See application file for complete search history.

(56) References Cited

U.S. PATENT DOCUMENTS

| | | | |
|---|---|---|---|
| 6,363,323 | B1 | 3/2002 | Jones |
| 6,374,176 | B1 | 4/2002 | Schmier et al. |
| 6,687,497 | B1 | 2/2004 | Parvulescu et al. |
| 6,946,977 | B2 | 9/2005 | Chen et al. |
| 8,892,359 | B2 | 11/2014 | Wippler |
| 8,930,059 | B2 | 1/2015 | Neff |

(Continued)

FOREIGN PATENT DOCUMENTS

| | | |
|---|---|---|
| CA | 2352065 A1 | 1/2003 |
| CN | 201231732 Y | 5/2009 |

(Continued)

OTHER PUBLICATIONS

"Bus and Train Safety", © 2016, Edmonton Police Service.

(Continued)

*Primary Examiner* — John F Mortell
(74) *Attorney, Agent, or Firm* — Brandon Hicks; Bejin Bieneman PLC

(57) ABSTRACT

A vehicle system includes a button programmed to output an alert signal, a communication interface programmed to wirelessly transmit an alert message, and a processor programmed to command the communication interface to transmit the alert message to an emergency service provider in response to the button outputting the alert signal. The alert message identifies a future vehicle stop and a time of arrival at the future vehicle stop.

12 Claims, 6 Drawing Sheets

(56) References Cited

U.S. PATENT DOCUMENTS

| | | | | |
|---|---|---|---|---|
| 2002/0069017 A1* | 6/2002 | Schmier | ............... | G08G 1/123 |
| | | | | 701/469 |
| 2004/0257210 A1* | 12/2004 | Chen | ............... | G08B 25/016 |
| | | | | 340/426.19 |
| 2012/0326891 A1 | 12/2012 | Cross | | |
| 2015/0235782 A1 | 8/2015 | Park | | |
| 2015/0289122 A1* | 10/2015 | Friesen | ............... | H04W 4/02 |
| | | | | 455/404.2 |
| 2016/0071418 A1 | 3/2016 | Oshida et al. | | |

FOREIGN PATENT DOCUMENTS

| | | |
|---|---|---|
| CN | 104916062 A | 9/2015 |
| EP | 1280120 A1 | 1/2003 |

OTHER PUBLICATIONS

"Metro—Getting Around—Safety & Security—Metrobus and Metrorail Safety & Securty", Oct. 26, 2016, http://www.wmata.com/getting_around/safety_security/bus_rail.cfm.

International Search Report and Written Opinion dated Apr. 14, 2017; Appl. No. PCT/US2017/015971.

* cited by examiner

AUTONOMOUS BUS SILENT ALARM

BACKGROUND

An autonomous bus is a bus that autonomously navigates from one stop to the next. The autonomous bus autonomously navigates to predetermined locations (i.e., "bus stops"), stops at each location, opens the door so that passengers can enter or exit the bus, collects payment information, etc., without a driver.

DETAILED DESCRIPTION

Passengers of traditional busses who are experiencing an emergency, such as a medical emergency or theft, can notify the driver. The driver may take an appropriate action such as stopping the bus and contacting the police or an ambulance. A passenger of an autonomous bus cannot rely on the driver to help during an emergency, however.

One solution includes incorporating, into the autonomous bus, an emergency notification system for passengers to contact emergency services. In the case of a thief on the bus, the passenger should be able to contact emergency services without notifying the thief that police have been called. An example emergency notification system for an autonomous bus includes a button programmed to output an alert signal, a communication interface programmed to wirelessly transmits an alert message, and a processor programmed to command the communication interface to transmit the alert message to an emergency service provider in response to the button outputting the alert signal. In other words, the alert signal causes the alert message to be generated and transmitted. The alert message identifies a future vehicle stop and a time of arrival at the future vehicle stop.

In some possible implementations, the autonomous bus can coordinate its arrival at the next stop with emergency services. For example, the autonomous bus can arrive at the next stop at the same time or after emergency services arrive. Thus, if the alert signal output by the button is a silent alert, a thief on the bus will not know that police have been contacted, nor will the thief have an opportunity to exit the bus prior to, e.g., the police arriving at the next bus stop.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 1:
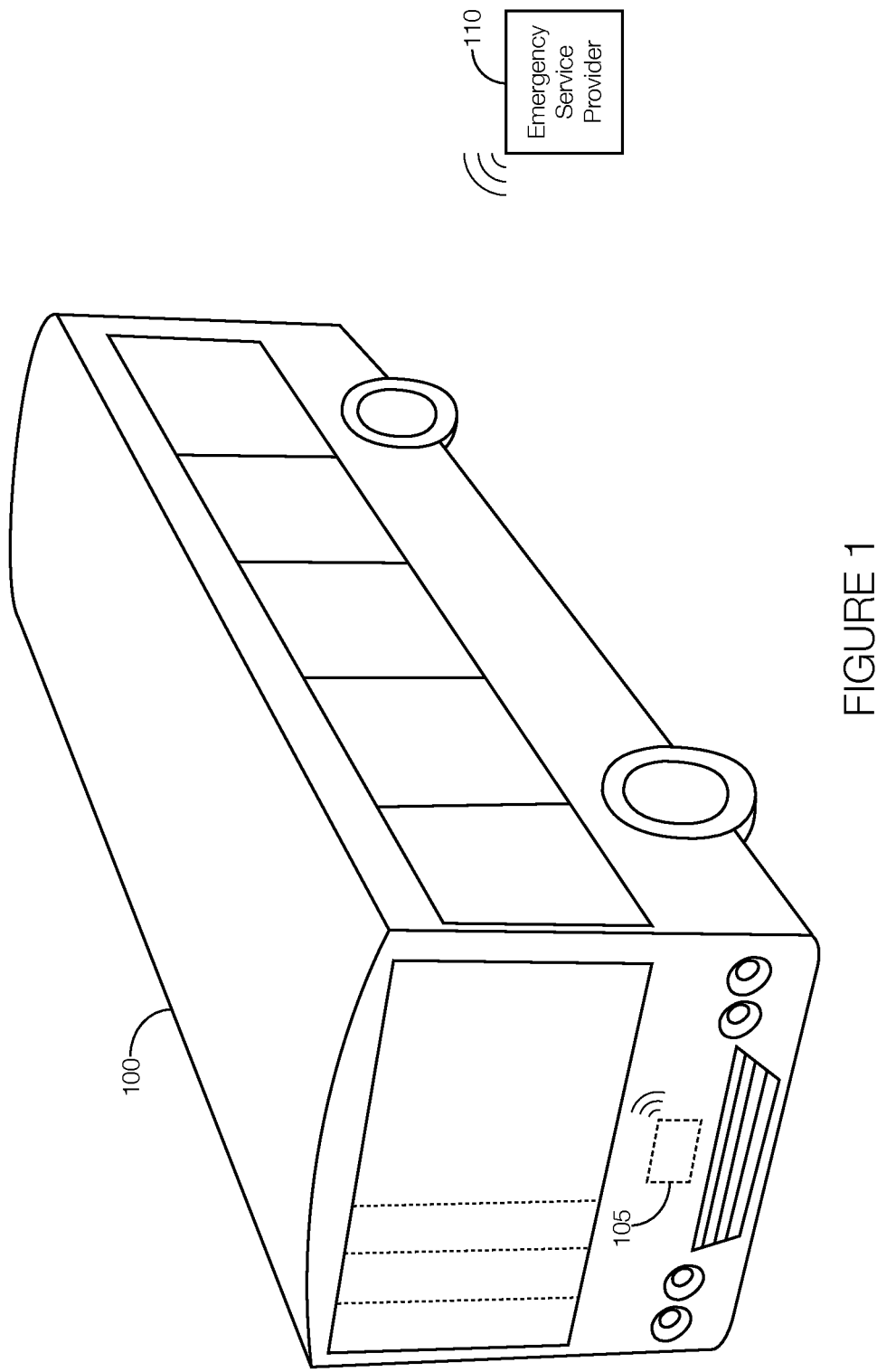
FIG. 1 illustrates an example autonomous bus with an emergency notification system.

As illustrated in FIG. 1, an autonomous bus 100 includes an emergency notification system 105. As described in greater detail below, the emergency notification system 105 communicates with an emergency service provider 110 if one or more passengers located in the autonomous bus 100 reports an emergency. For instance, the emergency notification system 105 may wirelessly transmit an alert message to the emergency service provider 110, and in some instances, coordinate arrival at a future bus stop (such as the next bus stop), with the emergency service provider 110.

The autonomous bus 100 is a large automobile able to simultaneously transport numerous passengers by road. The autonomous bus 100 may operate in an autonomous (e.g., driverless) mode, a partially autonomous mode, or a non-autonomous mode. When operating in an autonomous mode, the autonomous bus 100 navigates to various stops, allows passengers to enter or exit the autonomous bus 100, collects payment information, etc., without a driver present.

The emergency service provider 110 may refer to a police department, a fire department, an ambulance, a hospital, or the like. The emergency notification system 105 may communicate with the emergency service provider 110 by way of a networked server. The emergency service provider 110 may receive the alert messages transmitted to the server, determine the appropriate emergency response, and coordinate the response with the emergency notification system 105. An example of an emergency response includes dispatching a police car, fire truck, or ambulance to the autonomous bus 100. Further, as discussed in greater detail below, the emergency notification system 105 and the emergency service provider 110 may coordinate the arrival of the emergency service provider 110 and the autonomous bus 100 at a future stop so, e.g., both arrive at the same time or the emergency service provider 110 arrives at the future stop before the autonomous bus 100.

Figure 2:
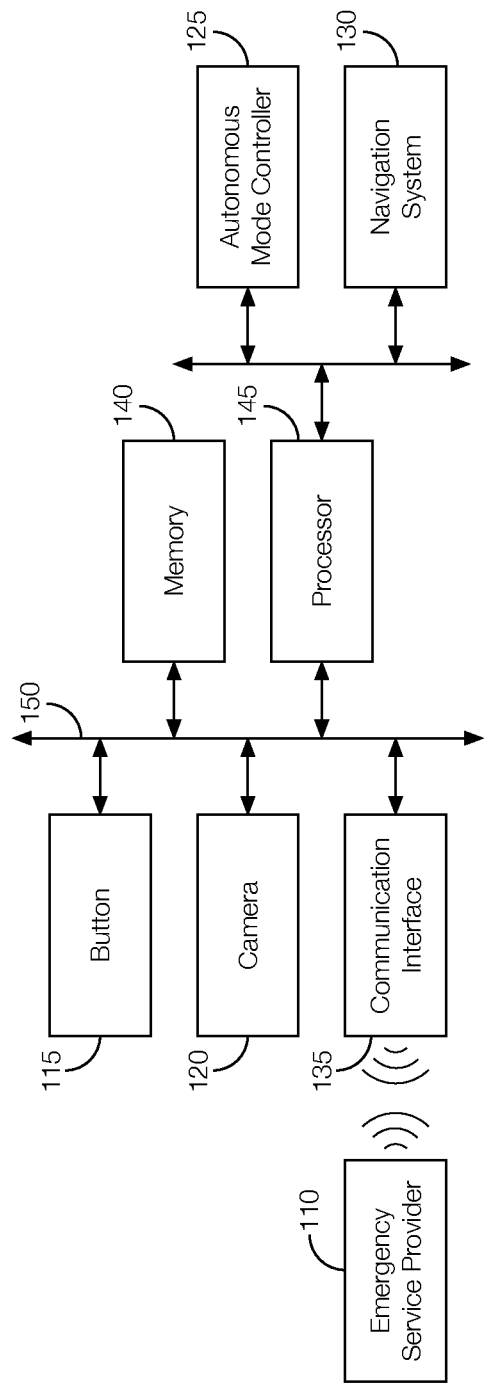
FIG. 2 is a block diagram showing example components of the emergency notification system and the autonomous bus.

Referring now to FIG. 2, the emergency notification system 105 includes, or works in accordance with, multiple buttons 115, a camera 120, an autonomous mode controller 125, a navigation system 130, a communication interface 135, a memory 140, and a processor 145 in communication over a communication network 150. The communication network 150 includes hardware, such as a communication bus, for facilitating communication among components of the autonomous bus 100, the emergency notification system 105, or both. The communication network 150 may facilitate wired or wireless communication among the vehicle components in accordance with a number of communication protocols such as controller area network (CAN), Ethernet, WiFi, Local Interconnect Network (LIN), and/or other wired or wireless mechanisms.

The buttons 115 are physical or virtual buttons 115 located inside the autonomous bus 100. The buttons 115 may be located in a rail extending along a length of the autonomous bus 100 (see FIGS. 3 and 5A-5B), located under the seats or between seats (see FIGS. 4A-4B), etc. When pressed, the button 115 is programmed or otherwise configured to output an alert signal to the processor 145 indicating that one of the passengers wishes to report an emergency to the emergency service provider 110. Each button 115 may be associated with a unique identifier. The unique identifier may be a combination of letters and numbers that can be used to distinguish one button 115 from another. In other words, no two buttons 115 located on the same autonomous bus 100 may share the same unique identifier. The unique identifier may be transmitted with or represented by the alert signal.

In some instances, the button 115 outputs the alert signal in response to a predetermined input pattern. That is, the alert signal is output as a result of someone inputting the predetermined input pattern. The predetermined input pattern may include double-clicking or triple-clicking the button 115 (i.e., pressing and releasing the button 115 twice or three times within a relatively short period of time, such as one second). Requiring the predetermined input pattern may reduce the number of false positives, which may occur if someone were to accidentally bump a nearby button 115.

The button 115 outputs the alert signal discreetly. That is, the alert signal is transmitted via the communication network 150 without an audible, visible, or haptic response. Other passengers may not know that the someone pushed one of the buttons 115. Thus, if the emergency is a suspected thief on board the autonomous bus 100, the thief will not be aware that one of the passengers pressed the button 115. Further, simply knowing that the buttons 115 are available may give the thief pause.

The camera 120 is a vision sensor located in the autonomous bus 100 with a view of some or all of the passengers. The autonomous bus 100 may include any number of cameras 120. Each camera 120 may include a lens that projects light toward, e.g., a CCD image sensor, a CMOS image sensor, etc. The camera 120 processes the light and generates an image. The image may be output to the processor 145 and, as discussed in greater detail below, can be used to identify who pressed the button 115, whether a thief is on board the autonomous bus 100, track the movement of the person who pressed the button 115, track the movement of the thief, etc. Moreover, the image may be transmitted to the emergency service provider 110 so, e.g., the emergency service provider 110 can visually confirm the emergency or determine if it was a false alarm.

The autonomous mode controller 125, implemented via circuits, chips, or other electronic components, is programmed to carry out various operations. The autonomous mode controller 125 receives data from various vehicle sensors, which may include a lidar sensor, a radar sensor, a vision sensor (i.e., an external camera), an ultrasonic sensor, etc. The autonomous mode controller 125 is programmed to output control signals in accordance with the signals received from the sensors. The control signals may be output to various actuators associated with steering, accelerating, and braking the autonomous bus 100. Thus, the autonomous mode controller 125 may output the control signals to execute the autonomous mode for the autonomous bus 100.

The navigation system 130 is implemented via circuits, chips, or other electronic components that can determine a present location of the autonomous bus 100. The navigation system 130 may be implemented via satellite-based system such as the Global Positioning System (GPS). The navigation system 130 may triangulate the location of the autonomous bus 100 based on signals received from various satellites in the Earth's orbit. The navigation system 130 is programmed to output signals representing the location of the autonomous bus 100 to, e.g., the processor 145 via the communication network 150. In some instances, the navigation system 130 is programmed to determine a route from the present location to a future location, such as a future bus stop. The navigation system 130 may access a virtual map stored in the memory 140 (discussed below) and develop the route according to the virtual map data.

The communication interface 135 is implemented via circuits, chips, or other electronic components that facilitate wireless communication between the autonomous bus 100 and the emergency service provider 110. For instance, the communication interface 135 may be programmed to wirelessly transmit the alert message after the button 115 outputs the alert signal. The communication interface 135 may be programmed to transmit the alert message in response to a command from the processor 145. That is, the command from the processor 145 causes the communication interface 135 to transmit the alert message. The alert message may indicate that a passenger has reported an emergency, the unique identifier for the button 115 pressed by the passenger, a unique identifier for the autonomous bus 100, the location of the autonomous bus 100 determined by the navigation system 130, a future bus stop, an estimated time of arrival at the future bus stop, etc.

In some possible implementations, the communication interface 135 is programmed to wirelessly receive an emergency response from the emergency service provider 110. The emergency response may indicate a time of arrival of the emergency service provider 110 at a future bus stop. The communication interface 135 may transmit the emergency response, including the time of arrival of the emergency service provider 110 at the future bus stop, to, e.g., the processor 145 over the communication network 150.

The communication interface 135 may be programmed to communicate in accordance with any number of wired or wireless communication protocols. For instance, the communication interface 135 may be programmed to communicate in accordance with a satellite-communication protocol, a cellular-based communication protocol (LTE, 3G, etc.), Bluetooth®, Bluetooth® Low Energy, Ethernet, CAN, WiFi, LIN, etc.

The memory 140 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 140 may store data such as a virtual map or table identifying future vehicle stops. The data stored in the memory 140 may be accessible to the processor 145, the navigation system 130, and possibly other components of the emergency notification system 105, the autonomous bus 100, or both.

The processor 145 is implemented via circuits, chips, or other electronic components that carry out various operations including processing the alert signal, processing the alert message, and processing the emergency response received from the emergency service provider 110, and possibly controlling certain autonomous operations of the autonomous bus 100. For instance, the processor 145 may receive the alert signal output by the button 115 pressed by one of the passengers, and in response, generate the alert message and command the communication interface 135 to transmit the alert message to the emergency service provider 110.

The processor 145 may be programmed to generate the alert message to include various information. For instance, the alert message may indicate that a passenger has reported an emergency, the unique identifier for the button 115 pressed by the passenger, a unique identifier for the autonomous bus 100, the present location of the autonomous bus 100 determined by the navigation system 130, a future bus stop, an estimated time of arrival at the future bus stop, etc. Thus, generating the alert message may include the processor 145 retrieving data stored in the memory 140, receiving data from the navigation system 130, receiving the unique identifier from the button 115, etc. For example, the processor 145 may be programmed to receive the present location of the autonomous bus 100 and query the memory 140 for the virtual map or table to determine the location of a future bus stop (e.g., the next bus stop) relative to the present location of the autonomous bus 100. The processor 145 may alternatively receive the present location of the autonomous bus 100, the location of the future bus stop, or both, from the navigation system 130. The processor 145 may be further programmed to determine the distance of the present location of the autonomous bus 100 to the future bus stop and calculate or estimate the time of arrival of the autonomous bus 100 as the future bus stop. The processor 145 may alternatively receive the distance to the future bus stop and the time of arrival from the navigation system 130. The processor 145, the navigation system 130, or both, may consider other information, such as the speed of the autonomous bus 100, when calculating or estimating the time of arrival at the future bus stop.

In one possible implementation, depending on the nature of the emergency, the processor 145 is programmed to coordinate the arrival of the autonomous bus 100 at the future vehicle stop with the arrival of the emergency service provider 110 at the future vehicle stop. For example, the processor 145 may be programmed to command the autonomous mode controller 125 to operate the autonomous bus 100 at a lower speed so that the emergency service provider 110 will arrive at the future bus stop before the autonomous bus 100. The processor 145 may determine the time of arrival of the emergency service provider 110 from the emergency response. That is, the emergency response may indicate when the emergency service provider 110 can arrive at the future bus stop. If the processor 145 determines that the autonomous bus 100 will arrive there first, the processor 145 may be programmed to command the autonomous mode controller 125 to slow the autonomous bus 100 so that the emergency service provider 110 will arrive at the future bus stop first.

The processor 145 may be programmed to coordinate the arrival of the autonomous bus 100 at the future stop to that of the emergency service provider 110 if, e.g., the emergency is a suspected thief on the autonomous bus 100. That way, the thief will not have an opportunity to exit the bus before the emergency service provider 110 (i.e., the police) arrives. Further, the processor 145 may command the autonomous mode controller 125 to reduce the speed of the autonomous bus 100 as little as necessary so that the thief will not notice that the autonomous bus 100 is moving slower than normal.

The processor 145 may be further programmed to help the emergency service provider 110 monitor what is happening on the autonomous bus 100 after someone presses the button 115. For instance, the processor 145 may process the image captured by the camera 120 and identify which passenger likely pressed the button 115 based on, e.g., the proximity of the passenger to the button 115 that was pressed. The processor 145 may further use image processing to identify other passengers nearby, including a potential thief. The processor 145 may further process additional images captured by the camera 120 to detect movement of the passengers, including the passenger who pressed the button 115 and the passenger who might be a potential thief. The processor 145 may command the communication interface 135 to transmit images captured by the camera 120 to the emergency service provider 110. Before commanding the communication interface 135 to transmit the images, the processor 145 may modify the image to indicate the person who pressed the button 115, the potential thief, and movement of the passengers. The processor 145 may modify the image using text or shapes (e.g., a circle, square, rectangle, etc.) around the passenger who pushed the button 115 and potential thief, if known. The shapes may be color-coded (i.e., green for the passenger who pressed the button 115 and red for the potential thief) or otherwise marked to make it clear to the emergency service provider 110 who is who.

Figure 3:
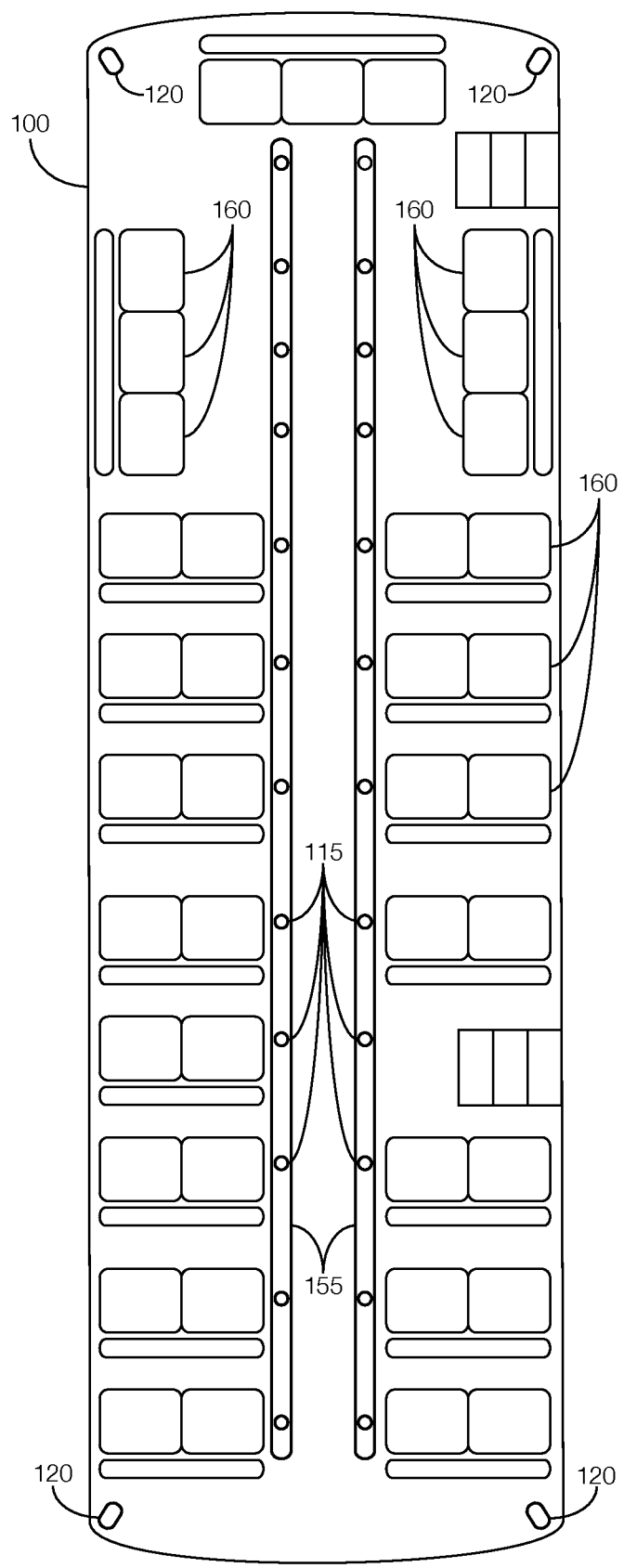
FIG. 3 is an overhead view showing example locations of buttons in the autonomous bus for activating the emergency notification system.
Figure 4A:
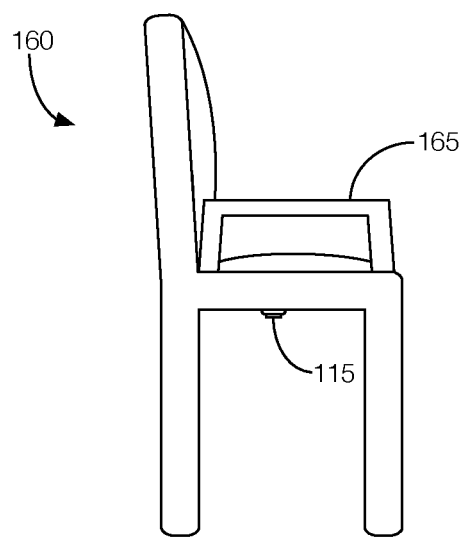
FIGS. 4A and 4B illustrate example locations of buttons relative to a seat located in the autonomous bus.
Figure 4B:
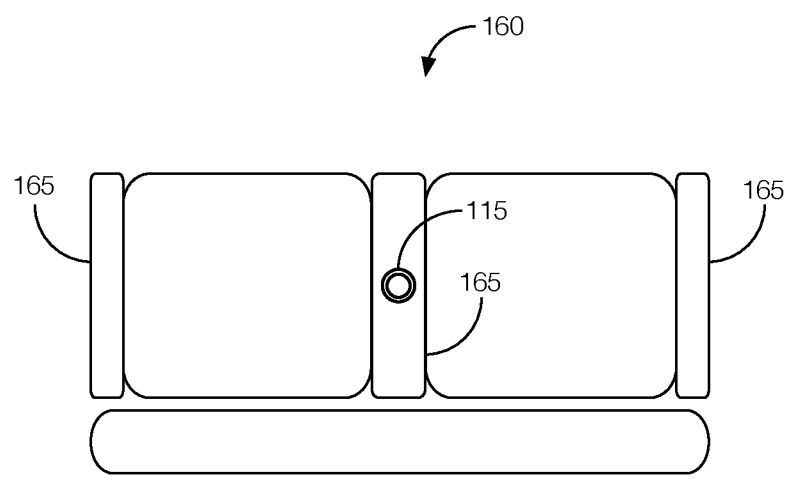

FIG. 3 is an overhead view showing example locations of buttons 115 in the autonomous bus 100 for activating the emergency notification system 105. FIGS. 4A and 4B illustrate example locations of buttons 115 relative to a seat 160 located in the autonomous bus 100. Only some seats 160 and buttons 115 are numbered for purposes of simplicity. As shown in FIG. 3, multiple buttons 115 may be incorporated into overhead rails 155 that extend along the length of the autonomous bus 100. Two overhead rails 155 are shown in FIG. 3, and each overhead rail 155 is shown with twelve buttons 115. The autonomous bus 100 may have any number of overhead rails 155 and any number of buttons 115. Further, with reference to FIGS. 4A and 4B, a button 115 may be located on one or more seats 160. FIG. 4A shows a button 115 located under a seat 160. FIG. 4B shows a button 115 located on an armrest 165 between two seats 160. When one of the buttons 115 located in the overhead rail 155 or on or between the seats 160 is pressed, such as when the button 115 is pressed with the predetermined input pattern, the button 115 outputs the alert signal to the processor 145. The processor 145 processes the alert signal and commands the communication interface 135 to transmit the alert message to the emergency service provider 110.

Figures 5A, 5B:
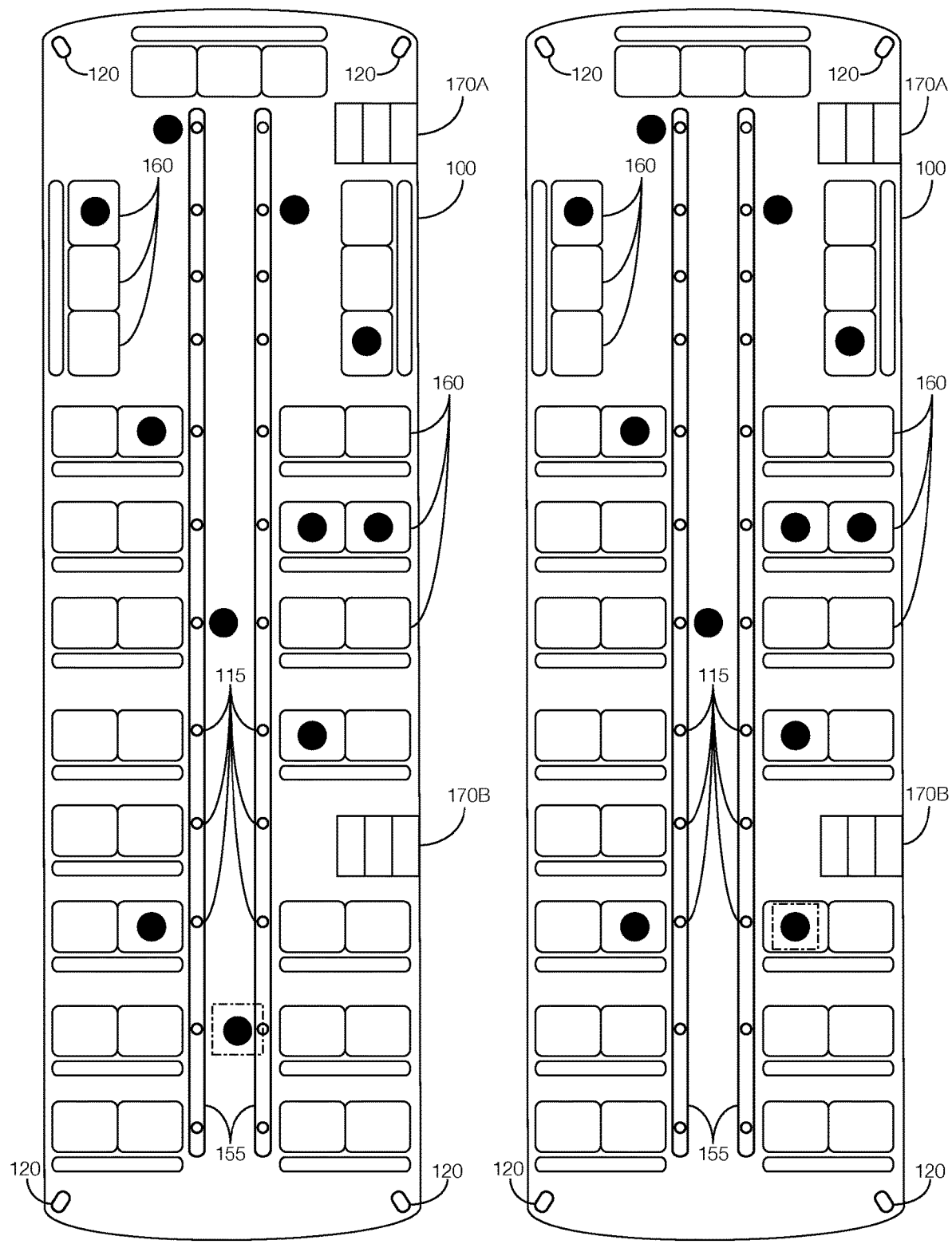
FIGS. 5A and 5B illustrate overhead views of the bus where the emergency notification system tracks movement of a person who pressed one of the buttons.

Referring now to FIGS. 5A and 5B, the processor 145 may further track movement of the person who pressed one of the buttons 115. FIG. 5A represents the locations of the passengers (shown as black dots) at the time one of the buttons 115 was pressed. The processor 145 may, in response to receiving the alert signal, command the camera 120 to capture an image from inside the autonomous bus 100. Thus, the receipt of the alert signal may cause the processor 145 to command the camera 120 to capture the image. The processor 145 may receive the image from the camera 120, process the image, and determine who pressed the button 115 based on who is closest to the button 115 that was pressed. For instance, the processor 145 may use image processing to determine which passenger's hand is closest to the button 115 that was pressed. The processor 145 may identify that person as the person who pressed the button 115.

In the example of FIG. 5A, the processor 145 may determine, from the unique identification in the alert signal, that a button 115 located near the rear of the autonomous bus 100 was pressed. Further, the processor 145 may process the image captured by the camera 120 to determine that the person standing next to the button 115 that was pressed was the person who pressed the button 115. The person identified by the processor 145 in FIG. 5A is shown with a box in phantom line.

Referring now to FIG. 5B, the processor 145 may track movement of the person who pressed the button 115. For instance, after the buttons 115 is pressed, the processor 145 may continue to receive images (still or video) captured by the camera 120. The processor 145 may perform image processing on the images to determine if the passenger who pressed the button 115 is moving about the autonomous bus 100. Further, the processor 145 may transmit any number of the images to the emergency service provider 110. In some instances, the processor 145 may alter one or more of the images to indicate to the emergency service provider 110 who pressed the button 115. For instance, as shown in FIGS.

5A and 5B, the processor 145 may alter the image to include a shape (such as a circle or rectangle) over the person the processor 145 determined pressed the button 115.

In the example of FIG. 5B, the person who pressed the button 115 moved toward the rear door 170B and sat down in one of the seats near the rear door 170B. The processor 145 may transmit this image to the emergency service provider 110. Thus, if the emergency is a medical emergency, the emergency service provider 110 may know who in the autonomous bus 100 is experiencing the medical emergency and where that person is located in the autonomous bus 100.

Figure 6:
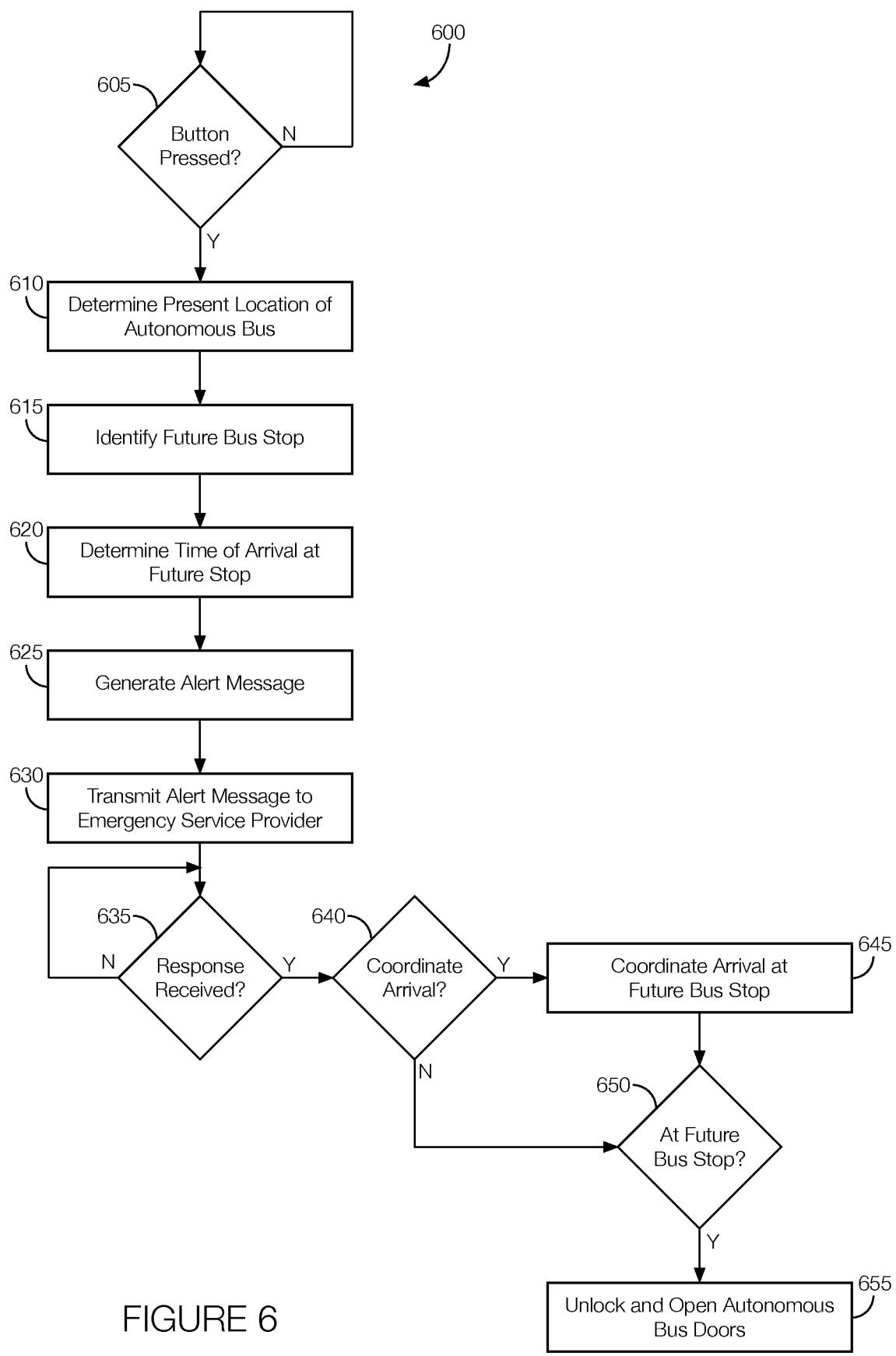
FIG. 6 is a flowchart of an example process that may be executed by the emergency notification system.

FIG. 6 is a flowchart of an example process 600 that may be executed by the emergency notification system 105. The process 600 may begin at any time while the autonomous bus 100 is running, at least in an "accessory" mode. The process 600 may continue to execute until, e.g., the autonomous bus 100 is no longer running.

At decision block 605, the emergency notification system 105 waits for a passenger to press a button 115. That is the processor 145 may determine whether the passenger has pressed the button 115 based on, e.g., whether the alert signal has been received. The alert signal may be generated and output by the button 115 in response to a passenger pressing the button 115 in accordance with the predetermined input pattern. If the alert signal is received by the processor 145, the process 600 proceeds to block 610. Otherwise, block 605 may repeat until the alert signal is received.

At block 610, the emergency notification system 105 determines a present location of the autonomous bus 100. For instances, the processor 145 may determine the present location of the autonomous bus 100 based on, e.g., signals received from the navigation system 130.

At block 615, the emergency notification system 105 identifies a future bus stop based on (i.e., relative to) the present location of the autonomous bus 100. The processor 145 may identify the future bus stop by accessing the virtual map stored in the memory 140 and selecting the next stop along a route of the autonomous bus 100 as the future bus stop. Instead of a map, the processor 145 may identify the future bus stop by accessing data stored in a table. That is, the processor 145 may determine which data represents the next bus stop along the route of the autonomous bus 100 and identify that bus stop as the future bus stop.

At block 620, the emergency notification system 105 determines a time of arrival of the autonomous bus 100 at the future vehicle stop. The processor 145 may determine the time of arrival based on the present location of the autonomous bus 100. That is, the processor 145 may calculate the time of arrival based on the distance between the present location of the autonomous bus 100 and the future bus stop, the speed of the autonomous bus 100, etc. The processor 145 may determine the distance between the present location of the autonomous bus 100 and the future bus stop from the data in the virtual map, the table, etc.

At block 625, the emergency notification system 105 generates an alert message. The processor 145 may generate the alert message that identifies the future bus stop, the time of arrival of the autonomous bus 100 at the future bus stop, the nature of the emergency (if known), an identification of the autonomous bus 100, an identification of the passenger who pressed the button 115, one or more images captured from the cameras 120 located inside the autonomous bus 100, or the like. Thus, before generating the alert message, the processor 145 may command one or more of the cameras 120 to capture an image from inside the autonomous bus 100, process the image to identify the passenger who pressed the button 115, update the image to show who pressed the button 115, and incorporate the updated image into the alert message. Further, some information, such as additional images, may be transmitted throughout other parts of the process 600.

At block 630, the emergency notification system 105 transmits the alert message to the emergency service provider 110. The processor 145 may command the communication interface 135 to wirelessly transmit the alert message to the emergency service provider 110. The processor 145 may, in some possible approaches, select among different emergency service providers 110 based on, e.g., the type of emergency, if known. That is, the processor 145 may command the communication interface 135 to transmit the alert message to a police department if the emergency involves a crime on the autonomous bus 100. The processor 145 may command the communication interface 135 to transmit the alert message to a hospital or ambulance service if the emergency involves a medical emergency. The processor 145 may command the communication interface 135 to transmit the alert message to a fire department if the emergency involves a fire on the bus. If the nature of the emergency is unknown, the processor 145 may command the communication interface 135 to transmit the alert message to a general emergency dispatcher (e.g., a 911 dispatcher).

At decision block 635, the emergency notification system 105 waits for an emergency response. The emergency response may be transmitted from the emergency service provider 110 and received at the emergency notification system 105 by the communication interface 135. The process 600 may proceed to block 640 when the emergency response is received. Otherwise, the process 600 may continue to execute block 635. In some instances, such as if the emergency response is not received within a certain amount of time (e.g., 2 minutes), the process 600 may return to block 630 so the emergency message may be transmitted again.

At decision block 640, the emergency notification system 105 determines whether to coordinate arrival at the future bus stop with the emergency service provider 110 based on the emergency response. The communication interface 135 may forward the emergency response to the processor 145, which may process the emergency response. The processor 145 may determine, from the emergency response, whether to coordinate the arrival of the autonomous at the future bus stop with the arrival of the emergency service provider 110 at the future bus stop. For instance, the emergency service provider 110 may indicate, in the emergency response, that arrival at the future bus stop should be coordinated. Whether to coordinate arrival at the future bus stop may be based on the nature of the emergency. For instance, coordinating arrival at the future bus stop may prevent a suspected thief from exiting the bus before police arrive. In some instances, such as based on the nature of the emergency, the processor 145 may automatically decide to coordinate arrival at the future bus stop. That is, if the processor 145 determines that the emergency involves a potential crime on the autonomous bus 100, the processor 145 may attempt to coordinate arrival at the future bus stop independent of an instruction to do so in the emergency response. In such instances, the processor 145 may indicate that it will coordinate arrival in the alert message transmitted at block 630. If the arrival at the future stop is to be coordinated, the process 600 proceeds to block 645. Otherwise, the process 600 proceeds to block 650.

At block 645, the emergency notification system 105 coordinates arrival at the future stop with the emergency service provider 110. For instance, the processor 145 may receive the time of arrival of the emergency service provider 110 at the future stop from the emergency response. The processor 145 may compare that to the time of arrival of the autonomous bus 100 at the future stop. If the autonomous bus 100 is predicted to arrive at the future stop before the emergency service provider 110, the processor 145 may command the autonomous bus 100 to slow its speed. For instance, the processor 145 may output a control signal to the autonomous mode controller 125 commanding the autonomous mode controller 125 to operate the autonomous bus 100 at a slower speed. The processor 145 may command the autonomous mode controller 125 to reduce the speed of the autonomous bus 100 by an amount so that the emergency service provider 110 will arrive at the future bus stop before the autonomous bus 100. The processor 145 may calculate the speed reduction based on a distance to the future bus stop and the time of arrival of the emergency service provider 110 at the future bus stop.

At decision block 650, the emergency notification system 105 may determine whether the autonomous bus 100 has arrived at the future bus stop. The processor 145 may make such a determination based on the present location of the autonomous bus 100 determined by the navigation system 130. Thus, when the processor 145 determines that the present location of the autonomous bus 100 and the future bus stop are the same, the processor 145 may determine that the autonomous bus 100 has arrived at the future bus stop. When the autonomous bus 100 arrives at the future bus stop, the process 600 may proceed to block 655. Otherwise, the process 600 continues to execute block 650.

At block 655, the emergency notification system 105 unlocks and opens the doors 170A and 170B to the autonomous bus 100. That is, the processor 145 may output a signal to a controller located in the autonomous bus 100 that commands the controller to unlock the doors 170A and 170B, open the doors 170A and 170B, or both. Doing so will allow the emergency service provider 110 to enter the autonomous bus 100 when the autonomous bus 100 is stopped. In some instances, the emergency notification signal will only send the signal to the controller to unlock the doors in response to approval from the emergency service provider 110. That is, the emergency service provider 110 may need to authorize the emergency notification system 105 to unlock the doors 170A and 170B, depending on the type of emergency (e.g., to prevent a thief from escaping).

The process 600 may end after block 655.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle system comprising:
   a button programmed to output an alert signal;
   a communication interface programmed to:
      wirelessly transmit an alert message, and
      wirelessly receive an emergency response from an emergency service provider, the emergency response indicating a time of arrival of the emergency service provider at a future vehicle stop; and
   a processor programmed to:
      command the communication interface to transmit the alert message to an emergency service provider in response to the button outputting the alert signal, the alert message identifying the future vehicle stop and a time of arrival at the future vehicle stop, and
      coordinate arrival at the future vehicle stop with the emergency service provider including by commanding an autonomous mode controller to slow a vehicle speed so that the time of arrival at the future vehicle stop is after the time of arrival of the emergency service provider at the future vehicle stop.

2. The vehicle system of claim 1, wherein the button outputs the alert signal in response to a predetermined input pattern.

3. The vehicle system of claim 2, wherein the predetermined input pattern includes double-clicking or triple-clicking the button.

4. The vehicle system of claim 1, further comprising a navigation system programmed to determine a present location, wherein the processor is programmed to identify the future vehicle stop and the time of arrival at the future vehicle stop based at least in part on the present location.

5. The vehicle system of claim 1, further comprising a memory storing a virtual map, wherein the processor is programmed to identify the future vehicle stop from the virtual map stored in the memory.

6. The vehicle system of claim 5, wherein the processor is programmed to calculate the time of arrival at the future vehicle stop based on a distance to the future vehicle stop and a vehicle speed, wherein the distance is determined from the virtual map.

7. The vehicle system of claim 1, further comprising a memory storing a table, wherein the processor is programmed to identify the future vehicle stop and determine the time of arrival at the future vehicle stop from data in the table.

8. A method comprising:
   receiving an alert signal;
   identifying a future vehicle stop;
   determining a time of arrival of a vehicle at the future vehicle stop;
   generating an alert message that identifies the future vehicle stop and the time of arrival of the vehicle at the future vehicle stop;
   commanding a communication interface to wirelessly transmit the alert message to an emergency service provider; and
   coordinating arrival at the future vehicle stop with the emergency service provider including by receiving an emergency response from the emergency service provider, the emergency response indicating a time of arrival of the emergency service provider at the future vehicle stop, and commanding an autonomous mode controller to slow a vehicle speed so that the time of arrival at the future vehicle stop is after the time of arrival of the emergency service provider at the future vehicle stop.

9. The method of claim 8, further comprising determining a present location of the vehicle, wherein identifying the future vehicle stop and determining the time of arrival at the future vehicle stop are based at least in part on the present location of the vehicle.

10. The method of claim 8, wherein identifying the future vehicle stop includes accessing a virtual map stored in a memory and identifying the future vehicle stop from the map.

11. The method of claim 10, wherein determining the time of arrival at the future vehicle stop includes calculating the time of arrival at the future vehicle stop based on a distance to the future vehicle stop and a vehicle speed, wherein the distance is determined from the virtual map.

12. The method of claim 8, wherein identifying the future vehicle stop and determining the time of arrival at the future vehicle stop includes accessing data stored in a table.

* * * * *